United States Patent [19]
Marple et al.

[11] Patent Number: 4,963,445
[45] Date of Patent: Oct. 16, 1990

[54] ELECTROCHEMICAL CELLS HAVING SPIRALLY WOUND ELECTRODE ASSEMBLIES

[75] Inventors: Jack W. Marple, Elyria; Samuel D. Navé, Avon Lake, both of Ohio

[73] Assignee: Eveready Battery Co., Inc., St. Louis, Mo.

[21] Appl. No.: 348,367

[22] Filed: May 8, 1989

[51] Int. Cl.$^5$ .............................................. H01M 6/10
[52] U.S. Cl. ...................................... 429/94; 429/211
[58] Field of Search ................................. 429/211, 94

[56] References Cited

U.S. PATENT DOCUMENTS

| | | | |
|---|---|---|---|
| 4,333,994 | 6/1982 | Urry | 429/94 |
| 4,450,213 | 5/1984 | Dey | 429/105 |
| 4,507,368 | 3/1985 | Hashimoto | 429/94 X |
| 4,550,064 | 10/1985 | Yen et al. | 429/94 |
| 4,604,333 | 8/1986 | Ikeda et al. | 429/94 |
| 4,707,421 | 11/1987 | McVeigh, Jr. | 429/94 |

Primary Examiner—Stephen J. Kalafut
Attorney, Agent, or Firm—Robert W. Welsh

[57] ABSTRACT

A spirally wound electrode assembly for use in electrochemical cells has an outer anode layer and an electrically insulating and ionically impermeable overwrap film disposed about the assembly. The outer anode layer has a tab located thereon. The overwrap film is inserted into the assembly between the end of the cathode layer and one of the anode layers. Upon forced discharge of the cell, the portion of the anode with the tab is disconnected in a fuse-like manner from the remainder of the anode, and the circuit is thereby broken.

32 Claims, 2 Drawing Sheets

ELECTROCHEMICAL CELLS HAVING SPIRALLY WOUND ELECTRODE ASSEMBLIES

This invention relates to electrochemical cells having spirally wound electrode assemblies and a means for rendering such cells resistant to the problems occurring during forced discharging.

High energy density electrochemical cells intended for high rate applications employ a spirally wound electrode assembly. Such assemblies enable the use of a relatively large amount of active materials, and because the anode and cathode are so close together, the electrochemical reactions proceed with low resistance.

Forced discharge can result when a fully discharged cell is used in series with fully charged cells. This can lead to undesirable consequences. If the cell is forced to discharge, voltage reversal can occur. This results in plating of metallic anode material from the electrolyte salt onto the cathode. If the plating is allowed to continue, dendrites of anode material can form and grow back through the separator to eventually contact remaining active anode. This dendrite bridge is a very low resistance path between the anode and cathode and causes an internal short. This can eventually result in a thermal runaway of the cell.

U.S. Pat. No. 4,450,213 discloses one method of addressing the problem of voltage reversal. That method involves sandwiching a piece of copper foil down the entire length of and between two sections of anode material. Unfortunately, the copper foil takes up space which could be used for active material, and an extra processing step is required.

As discussed in U.S. Pat. No. 4,707,421, the voltage reversal problem is most evident in cells which have an outside wrap of anode material and an anode tab located on the outer wrap. The patent discloses a method for avoiding the voltage reversal problem by locating the anode tab on a portion of the anode which is disposed between two portions of cathode. Also, the terminal edge of the cathode is covered with tape to prevent the flow of ions from the edge. The theory of success of the cells of U.S. Pat. No. 4,707,421 is that the portion of anode sandwiched between the two sections of cathode will be consumed prior to the consumption of the outer wrap portion of anode which has cathode disposed only on one side. Thus, the tab which is located on the sandwiched portion of the anode will be disconnected from the rest of the anode once the sandwiched portion is consumed. An obvious disadvantage of this solution is that a relatively large amount of anode is not utilized. Also, covering the end of the cathode with tape presents production and processing difficulties.

In view of the disadvantages of known methods, there remains a need for the solution to the problems resulting from voltage reversal in electrochemical cells using spirally wound electrode assemblies.

SUMMARY OF THE INVENTION

This invention is a spirally wound electrode assembly comprising alternating layers of a cathode and an anode, wherein each such layer has a layer of electrically insulating, ionically permeable separator positioned therebetween. The outer electrode of the assembly is an anode layer. The assembly further comprises an ionically impermeable, electrically insulating overwrap film which is disposed about the wound layers of cathode, anode and separator, and has a first section extending a length into the end of the wound layers of cathode, anode and separator on one side of the outermost cathode layer. An anode tab is located on a portion of the outer anode layer which tab location portion of anode is directly radially outward of the first section of overwrap film.

In another aspect, this invention is an electrochemical cell comprising such an electrode assembly, wherein the tab provides the only contact between the anode and an anode terminal.

In yet another aspect, this invention is an electrochemical cell having a spirally wound electrode assembly. The assembly comprises alternating layers of a cathode strip and an anode strip wherein each such layer has a layer of an ionically permeable, electrically insulative separator strip positioned therebetween. Each layer of anode, cathode and separator has an inner and an outer surface, wherein the inner surface is the surface facing the center of the spiral. The reactive amount of cathode is less relative to the reactive amount of anode. The outer electrode layer is anode, and thus a cathode layer is only disposed next to the outer anode layer's inner surface. This cathode has anode disposed next to both its inner and outer surfaces, and has a terminating end. An ionically impermeable, electrically insulating overwrap film is wrapped about the wound strips of anode, cathode and separator strips, and has a first section disposed in between the terminating cathode end and one of the anode layers. An anode tab is located on the outer layer of anode directly radially outwardly opposite the overwrap film, and provides the only contact between the anode and an anode terminal. During forced discharge of the cell, the portion of anode on which the tab is located is physically and electrically disconnected from the rest of the anode.

During forced discharge, in the electrochemical cells of this invention, the anode tab is separated from the rest of the anode in a fuse-like manner and the internal electrical circuit is thereby broken. Thereby, the cells substantially avoid the voltage reversal problem.

DETAILED DESCRIPTION OF THE INVENTION

Figure 1:
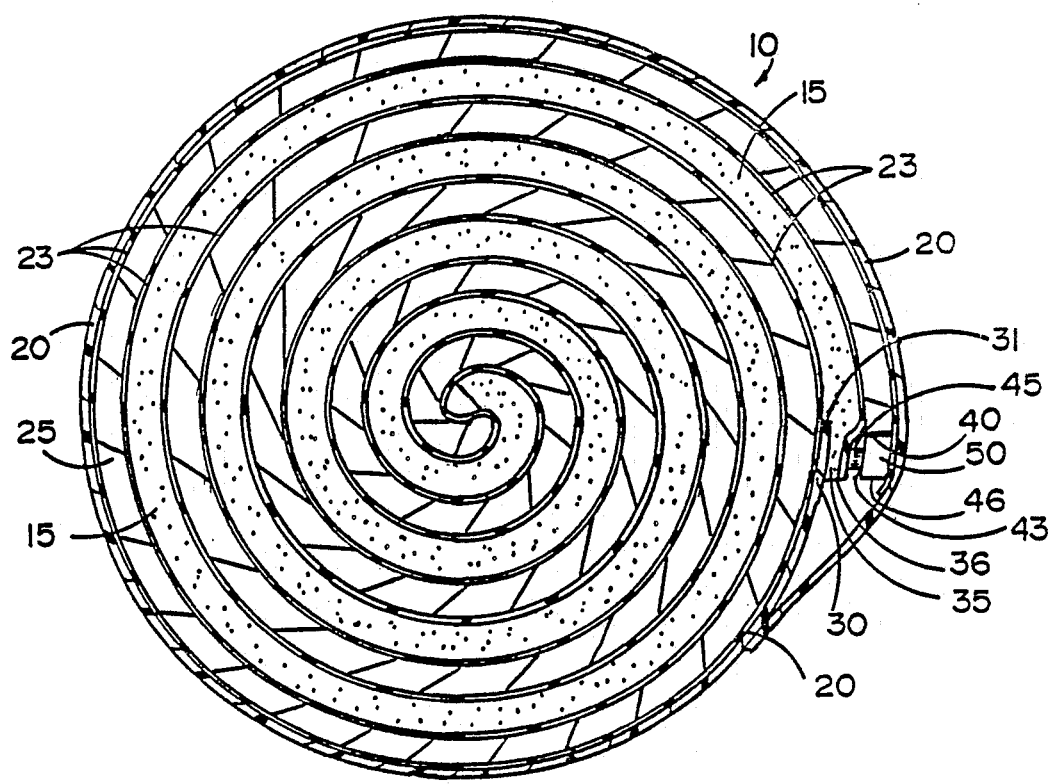
FIG. 1 depicts a cross-section view of one version of an electrode assembly of this invention.

As mentioned above, the cells of this invention avoid the voltage reversal problem because the portion of the anode on which the anode tab is located can be disconnected from the rest of the anode during forced discharge of the cell, and the cell's electrical circuit is thus broken.

This invention shall be described in terms of "layers" of anode, cathode and separator. This term includes separate pieces of anode, cathode or separator, or to a single strip of anode, a strip of separator, a strip of cathode and another strip of separator laid next to each other respectively and wound to provide a spiral having a plurality of distinct layers. Each layer of anode and cathode will have a layer of separator positioned therebetween. Also, every layer will have an inner and outer surface. The inner surface is the surface of the layer facing the center of the spiral.

The cathode can be in the form of strips, foils or impregnated screen. Examples of suitable cathode materials include transition metal oxides, transition metal sulfides, and polycarbon fluoride polymers. Preferred cathode materials are $FeS_2$, $MnO_2$, $(C_2F)_n$, $(CF_x)_n$, $WO_3$, $MoO_3$, $MoS_2$, lead oxides, cobalt oxides, copper oxides, CuS, $CuS_2$, $Bi_2O_3$, $In_2O_3$, NiS, $Ag_2CrO_4$, $Ag_3PO_4$ and $TiS_2$. Preferably the cathode material is provided in strip form by coating a mixture of active cathode material, binder and conductive agent onto or incorporating such a mixture into a carrier. Although expanded metal screens are suitable carriers the preferred carrier is a metal foil. Suitable metal foil carriers are those known n the art for such a purpose.

The efficacy of the invention relies on the physical disconnection of the tab location portion of the anode from the rest of the anode. Thus, it is highly preferred that the anode be in the form of a foil of anode material without a carrier. Examples of suitable anode materials are the alkali metals, alkaline earth metals, other metals and alloys thereof. Preferred alkali and alkaline earth metals are lithium, sodium, potassium, calcium and magnesium. Although, the specific anode material will vary according to the desired cell system, generally lithium is most preferred. Another preferred metal is aluminum. The preferred cathode to be associated with a lithium anode is $FeS_2$.

Examples of suitable separator materials are microporous polypropylene or polyethylene and nonwoven materials such as nonwoven polypropylene or glass fiber mats.

In the spirally wound electrode assemblies in the present invention, the anode is the outer electrode layer relative to the center of the wound assembly. Since the cathode and anode layers alternate, the outer anode layer will have cathode disposed only next to its inner surface. This cathode layer is the outermost cathode layer, and has anode disposed next to both its inner and outer surfaces and has a terminating end.

An overwrap film which is electrically insulating and ionically impermeable is disposed about the entire wound electrode assembly. Therefore, the outermost material of the assembly is the overwrap film. This film has a first section which extends a length into the assembly on one side or surface of the terminating end of the outermost cathode layer. Because the film is ionically impermeable, the film blocks the flow of ions between that portion of the cathode and the anode layer juxtaposed to the other side of the film.

Examples of suitable overwrap films are nonporous polyethylene, polypropylene or certain polyesters. Preferably, nonporous polypropylene is employed.

A tab is located on a portion of the outer anode layer directly radially outward from the first section of overwrap film. Thus, this tab location portion can be considered as having boundaries. On one side the boundary is the portion of the outer anode layer which is radially outward of the leading edge of the first section of the overwrap film, i.e. the edge of the length extending into the assembly. The other boundary is the terminating edge of the outer anode layer. Thus, the tab location portion is at least equal in length to the length of the first section of overwrap film which extends into the assembly. The tab provides the only contact between the anode and the anode terminal of the cell. In this regard, the overwrap film prevents contact between the outer anode layer and the cell container.

In one embodiment of this invention, the overwrap film lies between the end of the outermost cathode layer and the anode disposed on this cathode layer's inner surface. It is preferable in this embodiment for the outer layer of anode to have a section extending beyond the terminating end of the outermost cathode layer. The tab is preferably located on this extending section of anode. In this embodiment, after experiencing forced discharge, the anode can have two break points. One point can be on the outer layer of anode adjacent the edge of the terminating end of the cathode, and the other can be on the layer of anode disposed next to the cathode's inner surface at a point juxtaposed to the leading edge of the overwrap film.

In another embodiment, the initial end of the overwrap film is disposed next to the outer surface of the outermost cathode layer and thus is between the terminating end of the outermost cathode layer and outer layer of anode. In this embodiment, the ends of the outermost cathode layer and the outer anode layer can be coterminous. After experiencing an effective amount of forced discharge, the cell's internal circuit can be disconnected. A break can occur on the outer anode layer at a point juxtaposed the initial edge of the overwrap film.

This assembly operates effectively when the anode and cathode are of identical widths and they are fully aligned during assembly. To account for inaccuracies which can be encountered during the manufacture of the strips or the assembly operation, the anode preferably has a narrower width relative to the cathode width. Although the entire length of anode can be narrower, it is sufficient if only the portion of anode opposite the edge of the terminating end of the outermost cathode layer is narrower. This narrowing can be accomplished by notching the anode in the area which will be opposite the end of the outermost cathode layer. It is also highly preferred that a lesser amount of active cathode relative to active anode is employed.

To complete the cell, a liquid electrolyte is employed. The electrolyte will vary according to the particular anode and cathode employed. Examples of suitable electrolytes include aqueous and nonaqueous solutions containing metal salt solutes. Preferred electrolytes for when alkali and alkaline earth metals are employed include organic solvents or mixtures thereof containing dissolved alkali or alkaline earth metal salts, e.g. propylene carbonate and dimethoxyethane containing, for example, $LiClO_4$ or $LiCF_3SO_3$.

To assemble the cell, a strip of electrode material, a strip of separator, a strip of the other electrode material and a strip of separator are introduced to a suitable winding apparatus. The order of the electrode materials is chosen to provide a wound assembly wherein the outer electrode is the anode. Just prior to when the electrodes and separators are completely wound, the first section of the overwrap film is inserted on one side of the terminating end of the cathode strip. The winding is then completed and has overwrap film wrapped completely around the assembly. The wound assembly is then placed in a cell container, and the electrolyte is added. Finally, the open end of the container is then sealed to provide the completed cell.

In the Figures, like numerals are to be understood as denoting like items in different Figures.

In FIG. 1, spirally wound electrode assembly 10 has cathode 15, anode 25, separator 23, and overwrap film 20. Film 20 has first section 30 extending into assembly 10 on the inner surface of cathode 15 between the terminating end 35 of cathode 15 and anode 25. Tab 45 is located on anode section 50 which extends beyond edge 36 of cathode end 35. Tab location portion 43 is bounded by the edge 31 of film 20 and edge 46 of anode section 50. When a cell uses such an assembly, and the cell is forced to discharge, anode 25 can break at points 40 and 41. Point 40 is on anode section 50 juxtaposed to edge 36 of cathode end 35. Point 41 is on anode 25 juxtaposed to the edge 31 of film 20.

Figure 2:
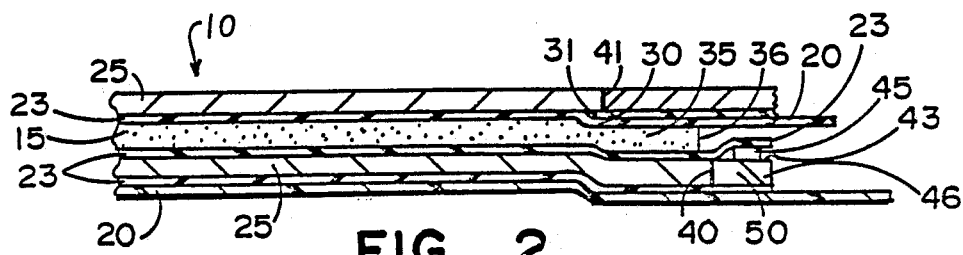
FIG. 2 depicts an enlarged view of the end of the cathode and anode, and the tab location of the electrode assembly depicted in FIG. 1.

In FIG. 2, the portion of assembly 10 with tab 45 is emphasized. Alternating layers of anode 25, separator 23, cathode 15 and separator 23 are shown. Tab 45 is located on extending anode section 50. Cathode end portion 35 is blocked from ionically permeable contact with anode 25 by the first section 30 of overwrap film 20.

Figure 3A:
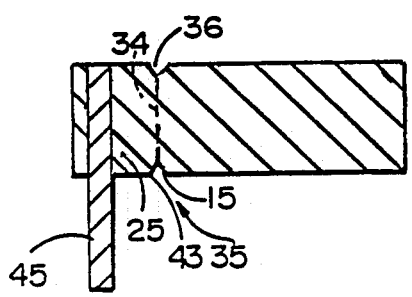
FIGS. 3a & b depict anodes having a portion removed.

FIG. 3(a) shows anode 25 with a tab 45 in contact with the entire width of anode 25. The dotted line 34 represents the edge 36 of terminating end 35 of cathode 15. Anode 25 further has notch 43.

Figure 3B:
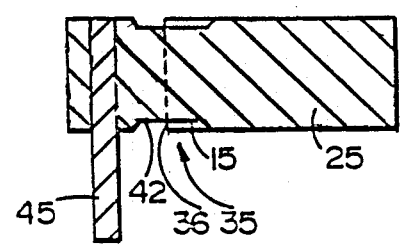

FIG. 3(b) shows anode 25 with tab 45. The dotted line 34 represents the edge 36 of end 35 of cathode 15. Anode 25 further has notch 42.

Figure 4:
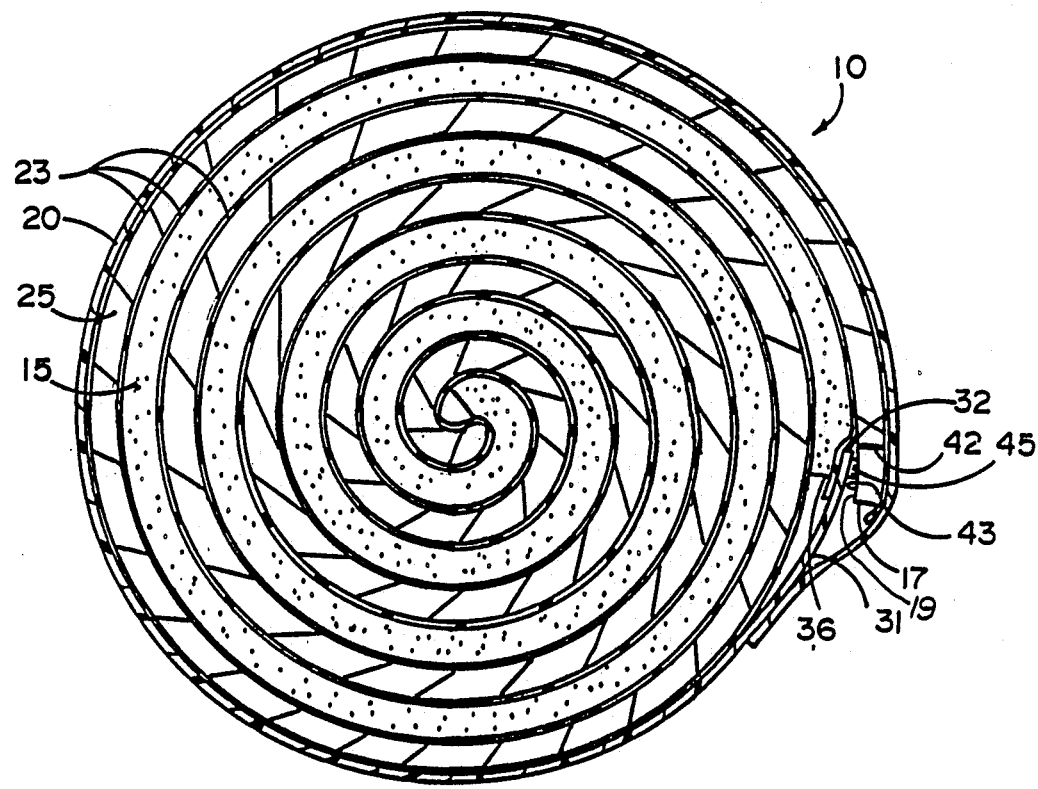
FIG. 4 depicts a cross-section view of another version of an electrode assembly of this invention.

In FIG. 4, an electrode assembly having a first section 31 of the overwrap film 20 extending between the outer anode layer and cathode is shown. The assembly 10 is comprised of cathode 15, anode 25, separator 23 and overwrap film 20. Film 20 has first section 31 extending into assembly 10 on the outer surface of cathode 15 between cathode end 36 and anode end 17. Although anode end 17 is shown coterminous with cathode end 36, it can extend beyond cathode end 36. It can also terminate before cathode end 36, so long as there is a portion radially outward of the first section of overwrap film. Tab 45 is located on anode end 17 adjacent to the first section 31 of film 20. Tab location portion 43 thus has boundaries set by edge 32 of film 20 and edge 19 of anode 25. When an electrochemical cell uses such an assembly, and the cell is forcibly discharged, anode 25 can break at point 42 which is juxtaposed to edge 32 of film 20.

Figure 5:
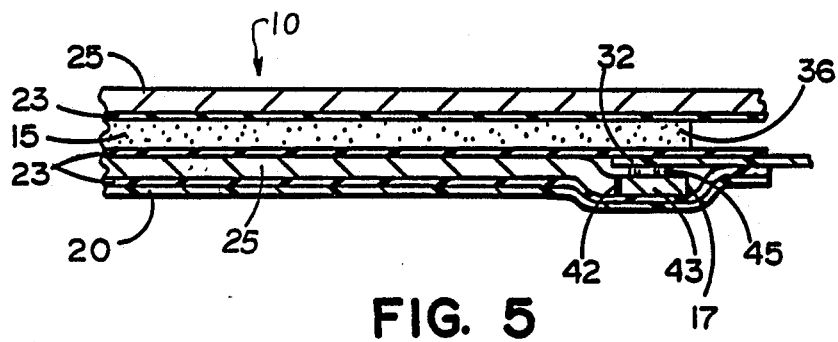
FIG. 5 depicts an enlarged view of the end of the cathode and anode, and the tab location of the electrode assembly depicted in FIG. 4.

In FIG. 5, the portion of assembly 10 with tab location portion 43 is emphasized. Alternating layers of anode 25, separator 23, cathode 15 and separator 23 are shown. Tab 45 is located on anode 25 at tab location portion 43, which has the boundaries described above. Cathode end 36 is blocked from ionically permeable contact with anode 25 by the first section 31 of overwrap film 20.

What is claimed:

1. A spirally wound electrode assembly comprising alternating layers of a cathode and an anode, wherein the anode and cathode layers have a layer of electrically insulating, ionically permeable separator positioned therebetween; wherein the outer electrode layer is an anode layer; said assembly further comprising an ionically impermeable, electrically insulating overwrap film disposed about the wound layers of cathode, anode and separator, said film having a first section extending into the end of the wound layers of cathode, anode and separator on one side of the outermost cathode layer; said outer anode layer further having an anode tab located thereon at a tab location portion which is directly radially outward of the first section of the overwrap film.

2. An electrochemical cell comprising an electrolyte and the electrode assembly of claim 1.

3. The cell of claim 2, wherein upon forced discharging of the cell the tab location portion of the anode is physically and electrically disconnected from the remainder of the anode.

4. The assembly of claim 1, wherein the overwrap film is juxtaposed to the inner surface of the outermost cathode layer.

5. The assembly of claim 4, wherein the outer anode layer has a section extending beyond the terminating end of the cathode, said extending anode section containing the tab.

6. An electrochemical cell comprising an electrolyte and the assembly of claim 5.

7. The cell of claim 6, wherein upon forced discharging of the cell the tab location portion of the anode is physically and electrically disconnected from the remainder of the anode.

8. The cell of claim 7, wherein the anode layer comprises a foil of an alkali or an alkaline earth metal, and the cathode layer is an active cathode material disposed on both sides of a metal foil carrier.

9. The cell of claim 8, wherein the foil anode layer is an alkali or alkaline earth metal selected from the group consisting of lithium, sodium, potassium, magnesium or calcium, and the active cathode material is a transition metal sulfide or a transition metal oxide.

10. The cell of claim 9, wherein the foil anode layer comprises lithium, and the active cathode material is $FeS_2$.

11. The electrode assembly of claim 1, wherein the overwrap film is juxtaposed to the outer surface of the terminating end of the cathode.

12. The assembly of claim 11, wherein the outer anode layer has an end coterminous with the terminating end of the cathode layer.

13. An electrochemical cell comprising an electrolyte and the electrode assembly of claim 12.

14. The electrochemical cell of claim 13, wherein upon forced discharging of the cell the tab location portion of the anode is physically and electrically disconnected from the remainder of the anode.

15. The electrochemical cell of claim 14, wherein the anode layer comprises a foil of an alkali or an alkaline earth metal, and the cathode layer is an active cathode material disposed on both sides of a metal foil carrier.

16. The electrochemical cell of claim 15, wherein the foil anode layer is an alkali or alkaline earth metal selected from the group consisting of lithium, sodium, potassium, magnesium or calcium, and the active cathode material is a transition metal sulfide or a transition metal oxide.

17. The electrochemical cell of claim 16, wherein the foil anode layer comprises lithium, and the active cathode material is $FeS_2$.

18. The assembly of claim 5 wherein said anode layer is narrower in width than said cathode at least in the area adjacent said cathode terminating end.

19. The assembly of claim 5 wherein said anode layer is notched in the area adjacent said cathode terminating end, to be narrower in said area.

20. An electrochemical cell having a spirally wound electrode assembly comprising alternating layers of a cathode strip and an anode strip, wherein the anode and cathode layers have a layer of an ionically permeable, electrically insulative separator strip positioned therebetween, wherein each layer of anode, cathode and separator has an inner and an outer surface, the inner surface being the surface facing the center of the spiral and wherein the reactive amount of cathode is greater relative to the reactive amount of anode; said assembly having an outer anode layer which thus has a cathode layer only disposed next to the outer anode layer's inner surface, which cathode layer having anode disposed next to both its inner and outer surfaces, and having a terminating end; said assembly further comprising an ionically impermeable, electrically insulating overwrap film wrapped about the wound strips of anode, cathode and separator strips; said film having a first section disposed in between the terminating cathode end and one of the anode layers; said outer anode layer having an anode tab located thereon radially outwardly opposite the overwrap film, said tab providing only contact between the anode and an anode terminal; wherein during forced discharge of the cell, the portion of anode on which the tab is located is physically and electrically disconnected from the rest of the anode.

21. The electrochemical cell of claim 20, wherein the overwrap film is juxtaposed to the inner surface of the outermost cathode layer.

22. The electrochemical cell of claim 21, wherein the outer anode layer has a section extending beyond the terminating end of the cathode, said extending anode section containing the tab.

23. The electrochemical cell of claim 22, wherein the overwrap film is juxtaposed to the outer surface of the terminating end of the cathode.

24. The electrochemical cell of claim 21, wherein the outer anode layer has an end coterminous with the terminating end of the cathode layer.

25. The electrochemical cell of claim 22, wherein the anode layer comprises a foil of an alkali or an alkaline earth metal, and the cathode layer is an active cathode material disposed on both sides of a metal foil carrier.

26. The electrochemical cell of claim 25, wherein the foil anode layer is an alkali or alkaline earth metal selected from the group consisting of lithium, sodium, potassium, magnesium or calcium, and the active cathode material is a transition metal sulfide or a transition metal oxide.

27. The electrochemical cell of claim 26, wherein the foil anode layer comprises lithium, and the active cathode material is $FeS_2$.

28. The electrochemical cell of claim 24, wherein the anode layer comprises a foil of an alkali or an alkaline earth metal, and the cathode layer is an active cathode material disposed on both sides of a metal foil carrier.

29. The electrochemical cell of claim 28, wherein the foil anode layer is an alkali or alkaline earth metal selected from the group consisting of lithium, sodium, potassium, magnesium or calcium, and the active cathode material is a transition metal sulfide or a transition metal oxide.

30. The electrochemical cell of claim 29, wherein the foil anode layer comprises lithium, and the active cathode material is $FeS_2$.

31. The electrochemical cell of claim 22 wherein said anode layer is narrower in width than said cathode at least in the area adjacent said cathode terminating end.

32. The electrochemical cell of claim 22 wherein said anode layer is notched in the area adjacent said cathode terminating end, to be narrower in said area.

* * * * *